(12) United States Patent
Singer

(10) Patent No.: US 8,612,360 B1
(45) Date of Patent: *Dec. 17, 2013

(54) SYSTEM, METHOD, AND APPARATUS FOR CONNECTING USERS ONLINE BASED ON FAMILIARITY OR INVITATION

(71) Applicant: Uri Singer, Encino, CA (US)

(72) Inventor: Uri Singer, Encino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,966

(22) Filed: Nov. 13, 2012

Related U.S. Application Data

(63) Continuation-in-part of application No. 12/070,340, filed on Feb. 15, 2008, now Pat. No. 8,311,949.

(60) Provisional application No. 60/901,476, filed on Feb. 15, 2007, provisional application No. 60/906,005, filed on Mar. 8, 2007, provisional application No. 60/933,965, filed on Jun. 8, 2007.

(51) Int. Cl.
*G06Q 99/00* (2006.01)
(52) U.S. Cl.
USPC .......................................................... 705/319
(58) Field of Classification Search
USPC .......................................................... 705/319
See application file for complete search history.

(56) References Cited

U.S. PATENT DOCUMENTS

| | | | |
|---|---|---|---|
| 5,719,560 A | 2/1998 | Watkins | |
| 5,774,525 A | 6/1998 | Kanevsky et al. | |
| 6,665,389 B1 | 12/2003 | Haste, III | |
| 6,959,861 B1 | 11/2005 | Walters | |
| 7,016,307 B2 | 3/2006 | Vasudev et al. | |
| 7,069,308 B2 | 6/2006 | Abrams | |
| 7,099,918 B2 | 8/2006 | Matti | |
| 7,231,657 B2 | 6/2007 | Honarvar et al. | |
| 7,454,357 B2 | 11/2008 | Buckwalter et al. | |
| 7,519,589 B2 * | 4/2009 | Charnock et al. | 1/1 |
| 7,545,784 B2 * | 6/2009 | Mgrdechian et al. | 370/338 |
| 7,639,672 B2 * | 12/2009 | Foote | 370/352 |
| 7,783,592 B2 | 8/2010 | Armstrong et al. | |
| 7,822,821 B2 * | 10/2010 | Foote | 709/206 |
| 7,882,039 B2 | 2/2011 | Weiss et al. | |
| 8,023,929 B2 * | 9/2011 | Mgrdechian et al. | 455/414.1 |
| 8,195,668 B2 * | 6/2012 | Drennan et al. | 707/748 |
| 2005/0273378 A1 | 12/2005 | MacDonald-Korth et al. | |
| 2007/0073548 A1 * | 3/2007 | Terrill et al. | 705/1 |
| 2007/0073549 A1 * | 3/2007 | Terrill et al. | 705/1 |
| 2008/0162646 A1 | 7/2008 | Pizano et al. | |

OTHER PUBLICATIONS

FriendsForFamilies.com, online matching service, launches today; web site helps families meet other families. (Sep. 20, 2006). PR Newswire. Retrieved from http://search.proquest.com/docview/451110796?accountid=14753.*
Cheryl Lejewell; Benefits of the task for the delivery of negative feedback; Kansas State University; Manhattan, Kansas; 2007.

* cited by examiner

*Primary Examiner* — Amanda Kirlin
(74) *Attorney, Agent, or Firm* — David L. Hoffman; Hoffman Patent Group

(57) ABSTRACT

A system and method enables registering entities to allow people to leave anonymous feedback without requiring an actual connection to be made or requested by one another, i.e., anonymously. Such system and method, and database, enables registered entities to receive anonymous feedback from a target audience.

21 Claims, 18 Drawing Sheets

| R1 | AS1 | AQ1 | AA1 | A1 | B1 | C1 | CR3 | CRn | COD1 |
|---|---|---|---|---|---|---|---|---|---|
| R2 | AS2 | AQ2 | AA2 | A2 | B2 | C2 | CRi | CRn | COD2 |
| . | | | | | | | | | |
| Ri | ASi | AQi | AAi | Ai | Bi | Ci | CR1 | CRn | CODi |
| . | | | | | | | | | |
| Rn | ASn | AQn | AAn | An | Bn | Cn | CR2 | CRi | CODn |

SYSTEM, METHOD, AND APPARATUS FOR CONNECTING USERS ONLINE BASED ON FAMILIARITY OR INVITATION

CROSS REFERENCE TO RELATED APPLICATION(S)

This application is a continuation-in-part of U.S. patent application Ser. No. 12/070,340 filed Feb. 15, 2008, which claims priority from U.S. Provisional Patent Application Ser. No. 60/901,476, filed Feb. 15, 2007, Ser. No. 60/906,005, filed Mar. 8, 2007 and Ser. No. 60/933,965, filed Jun. 8, 2007, all of which are incorporated by reference herein.

BACKGROUND OF THE INVENTION

1. Field of the Invention

The present invention relates to a system, method, and apparatus for connecting users in an online system based on knowledge of personal information.

2. Description of the Related Art

Social networking has grown in popularity in recent years. There are patents for determining how to connect people based on a network model where each person represents a node of a network and the systems determine how to link people up based on the network. U.S. Pat. Nos. 7,069,308 and 7,016,307 are examples of such linking processes. Both of these patents describe how to connect people based on their connections.

Dating services patents such as U.S. Pat. No. 6,666,389 connect one person to another based on personal preferences. For example, person A is connected to person B if they both have the same hobby. All prospective daters fill out the same questionnaire. The answers are compared and a score is created to determine "compatibility."

Information verification patents involve using questions and answers to verify identity typically of an account holder such as a credit card holder. U.S. Pat. No. 5,719,560, for example, teaches a method by which passwords are not needed to identify a person.

SUMMARY OF THE INVENTION

In various preferred embodiments, the present invention enables entities to permit other people to leave or communicate anonymous feedback or comments about each other without requiring an actual direct connection of users to be made or requested by the users. It is also preferred to have a system and database that allows users to register to receive anonymous feedback about themselves by providing personal information that an acquaintance or friend would need to know as a prerequisite to being allowed to leave feedback or comments. It is further preferred to allow entities to register to receive feedback and to allow people to be able to leave anonymous feedback.

In various preferred embodiments, an unregistered user (e.g., a person, business, or other entity) who would like to receive feedback registers to gain access to the system. Registration information may preferably include user name, password, first name, last name, middle name, and address information.

Preferably, the system may provide a user with legal releases and conditions to which he or she must agree before registering or completing registration. The system determines how people are able to connect with a registrant for the purpose of leaving anonymous feedback. The system may leave this determination to the user.

Preferably, the user selects from multiple methods of determining connection requirements. One possible requirement for connection is preferably based on knowledge of personal information. Using this method, a connection is made between a first user and a second user (a registrant) based on the amount of knowledge that the first user has about the second user. However, in other embodiments knowledge may be any type, personal or not. For example, the knowledge may relate to: birth city, pet's name, college attended, degree achieved, number of children, children's names, favorite hobby and favorite books.

The system may suggest to the registrant a list of default knowledge questions from which the user can choose or the user will be able to create new questions specifically tailored to him or her. The system preferably requires that a minimum number of questions must be defined, and each question defined be categorized according to the type of information that it contains. Exemplary types of information may include free form, phone number, location, address, landmark, and others.

Preferably for every question that gets categorized, the correct answer is normalized, such as by utilizing a plug-in infrastructure to normalize the information. For example, a question named "College Attended" can be categorized as a landmark and the correct answer is entered as UCSB. The system uses the landmark plug-in to normalize the UCSB name down to University of California, Santa Barbara. The system informs the registrant of that normalization and they will be able to either accept or reject the changes. The question may then be marked as either normalized or not.

In another preferred embodiment, the registrant is able to provide hints to other users about the answer. The hints are preferably used when the answer entered is not correct. For example, a question such as "My Favorite Song?" is entered with a correct answer of "People are People by Depeche Mode" and a hint that states "<song name> by <artist>". The hint will be displayed to a requesting person which will allow them to see the format of the answer. The hint could also be additional information about the question. For example, a question such as "High School Attended?" could have a hint of "during senior year" and that would provide requesting persons with additional information about the context of the question.

In a further preferred embodiment, the user may determine a threshold, e.g., a number or a percentage of correct answers that determines whether or not a person wanting to leave feedback is able to do so. When a person wanting to leave feedback enters the system, he/she will need to answer the questions. The system at that point calculates the number or percentage of questions answered successfully and either allows feedback to be left or not if the minimum number or percentage was not met.

Preferably, the system can make the above determination by determining the percentage of questions that were answered successfully. Preferably, the system utilizes spell checkers, pattern matching, and linguistic dictionaries to reduce the chance for a low score based on misspelling, differences in patterns (for example, a phone number is entered as xxx-xxx-xxxx as the answer but entered as (xxx)-xxx-xxxx as a verification answer in the registered user's profile), and differences in languages. The question category will be used to determine which plug-in to use for the verification of the answer. For example, a question such as "College Attended?" can be categorized as a landmark and the correct answer is University of California, Santa Barbara. If a person wanting to leave feedback enters UCSB instead of the full name, the answer will be normally rejected since it does not match the text of the correct answer. The system, however, would utilize a plug-in architecture and allow for information to be validated such that UCSB will be checked against a landmark database (online or offline) at which point the normalized name will be retrieved and matched against the question.

The system preferably compares information based on normalized information. The system also utilizes pattern matching to score the answer such that it is clear what percentage of the answer is correct. For example, if a question titled "My Favorite Song" in entered with a correct answer of "People are People by Depeche Mode" and a requesting user enters "People are People by Depeche Mode", the system may calculate that answer to be a percentage correct such as 93% or 83% (5 out of 6 word phase correct) due to the misspelling and thus may bet a score of 0.93 or 0.83. A threshold exists in the system which controls what is the minimum percentage allowed. Preferably, the registrant is able to determine what is the percentage that is acceptable for him or her.

Once all questions are defined, the registrant is able to make his or her profile active and thereby allow other users to leave anonymous feedback. Preferably, the system generates a unique identifier that is used by others to leave feedback about the registrant. When accessing the system's main page, a person wanting to leave feedback will need to enter the unique identifier first. Once the identifier is validated, the person is presented with the list of questions to answer before proceeding with leaving feedback. In one embodiment, a generic feedback mechanism may consist of either a freeform area to write feedback or a structured set of feedback topics and questions.

In another preferred embodiment, the system connects users if one user enters a correct and unique access code of another registered user. When registering to receive feedback, a registrant is able to specify that any person who knows a specific access code is able to leave feedback. The system at that point may either generate a unique access code or allow the registrant to specify the access code to be used. When people wanting to leave feedback access the system, such users must enter the unique access code of the desired target registrant to gain access to leave feedback.

In another preferred embodiment, when using the access code mechanism, a registrant is able to generate several codes and hand out such codes to receive different types of feedback. This can be used by a presenter who would like people to leave feedback for different presentations and therefore, creates a new access code for each presentation and hands it to the audience of each presentation accordingly.

BRIEF DESCRIPTION OF THE DRAWINGS

FIG. 2 is a schematic view of data stored in a database for use in the system of FIG. 1;

FIGS. 9 through 16 are illustrations of various user interfaces, according to an embodiment.

DESCRIPTION OF THE PREFERRED EMBODIMENT(S)

Figure 1:
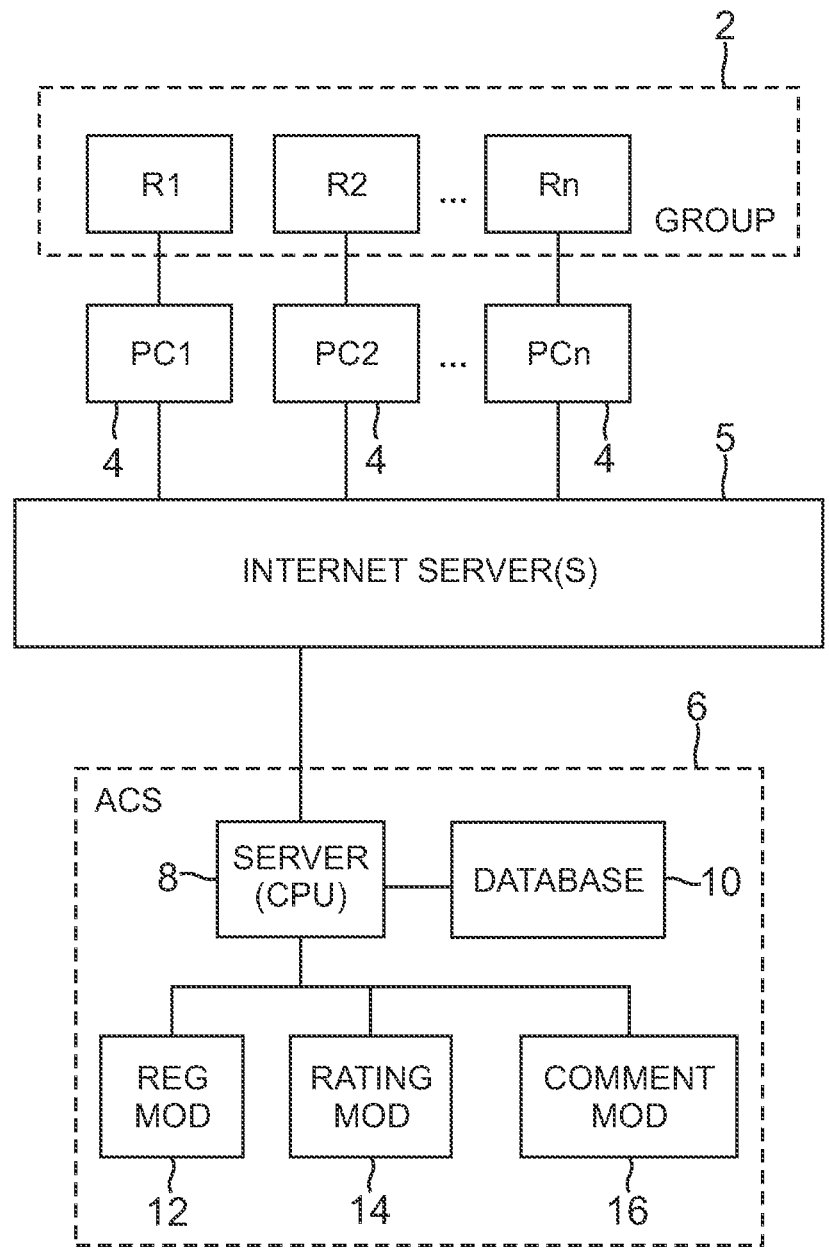
FIG. 1 is a schematic view of a system for a group of users to register and provide comments anonymously to other users in accordance with a preferred embodiment of the invention.

In a preferred embodiment, the system provides an unregistered user who would like to receive feedback the ability to register to gain access to the system. In an embodiment, the registration information includes user name, password, first name, last name, middle name, and address information.

In an embodiment, the registrant is provided with legal releases and conditions to which he has to agree before entering the system. Once the user agrees to these conditions, the registrant determines how people are able to connect with his or her profile for the purpose of leaving anonymous feedback.

The registrant selects from multiple methods of determining connection. In an embodiment, the connection is based on personal knowledge about the user (e.g., a person or business entity). Using this method, a connection is made between people based on the amount of knowledge that they have about a person. The knowledge is any type, being personal or not, but will be referred to herein as personal (since business, personal, social or other information is about the registrant and therefore personal). In an embodiment, the knowledge relates to any of birth city, pet's name, college attended, degree achieved, number of children, children names, favorite hobby and favorite book. In another embodiment, the knowledge relates to working conditions, day to day scheduling, current projects, personal details about persons who work at a business (e.g., hair color, names, etc.). In other embodiments, the knowledge relates to a service or item that was provided, and may include transaction details such as a payment that was made, a delivery or service date, a service person, etc.

In an embodiment, the system suggests to the registrant a list of default knowledge questions from which they can choose or the registrant will be able to create and add or substitute new questions specifically tailored to him or her. Preferably, the system requires that a minimum number of questions must be defined. Each questions defined needs to be categorized to the type of information that it contains. The types of information include freeform, phone number, location, address, landmark, and others.

Preferably, for every question that gets categorized, the correct answer is normalized by utilizing a plug-in infrastructure to normalize the information. For example, a question named "College Attended?" can be categorized as a landmark and the correct answer is entered as UCSB. The system uses the landmark plug-in to normalize the UCSB name down to University of California, Santa Barbara. Preferably, the system informs the registrant of that normalization and the registrant will be able to either accept or reject the changes. The question is then marked as either normalized or not.

The registrant is able to provide hints to other users about the answer. Such hints may be used when the answer entered is not correct. For example, a question such as "My Favorite Song?" is entered with a correct answer of "People are People by Depeche Mode" and a hint that states "<song name> by <artist>". The hint will be displayed to users (seeking connection) with additional information about the context of the question.

The registrant determines the number or percentage of correct answers that determines whether or not a person seeking connection and wanting to leave feedback is able to. When a person wanting to leave feedback enters the system, he or she will need to answer the questions and the system at that point calculates the percentage of questions answered successfully and either allows feedback to be left or not if the minimum percentage was not met. Alternatively, the system may define a percentage, e.g., 70% or 80% or have a default percentage (or number correct).

The system makes the above determination by determining the percentage of questions that were answered successfully. The system utilizes spell checkers, pattern matching, and linguistic dictionaries to reduce the chance for a low score based on misspelling, differences in patters (for example, a phone number is entered at xxx-xxx-xxxx as the answer but entered as (xxx)-xxx-xxxx as a verification answer for the comparison), and differences in languages. The question category will be used to determine which plug-in to use for the verification to the answer. For example, a question such as "College Attended?" can be categorized as a landmark and the correct answer is University of California, Santa Barbara. If a person wanting to leave feedback enters UCSB instead of the full name, the answer will be normally rejected since it does not match the text of the correct answer. The system, however, would preferably utilize a plug-in architecture and allow for information to be validated such that UCSB will be checked against a landmark database (online or offline) at which point the normalized name will be retrieved and matched against the question.

The system matches information based on normalized information. The system also utilizes pattern matching to score the answer such that it is clear what percentage of the answer is correct. For example, if a question such as "My Favorite Song?" is entered by the registrant along with a correct answer of "People are People by Depeche Mode" and a requesting user enters "People are People by Depeche Mode", the system preferably calculates that answer to be partly correct, e.g., 83% or 93% (or 0.83 or 0.93) correct due to the misspelling. A threshold exists in the system which controls what is the minimum percentage allowed for all questions. The registrant is preferably able to determine what is the percentage or minimum number correct that is acceptable.

Once all questions are defined, the registrant is able to make his or her profile active and thereby allow people to leave anonymous feedback. The system preferably generates a unique identifier that is used by others to leave feedback about the user. When accessing the system's main page, a person wanting to leave feedback will need to enter the unique identifier first. Once the identifier is validated, the person is presented with the list of questions to answer before proceeding with leaving feedback. In an embodiment, the feedback mechanism consists of either a freeform area to write feedback or a structured set of feedback topics and questions.

In an embodiment, the system alternatively also can provide a connection based on a provided access code. When registering to receive feedback, the registrant is able to specify that any person who knows a specific access code or allows the registrant to specify the code to be used. When people wanting to leave feedback access the system, they need to enter the code to gain access to leave feedback.

When using the access code mechanism, a registrant preferably is able to generate several codes and hand them out to receive different types of feedback. This can be used by a presenter who would like people to leave feedback for different presentations and therefore, creates a new access code for each presentation and hands it to the audience of each presentation accordingly.

In some embodiments, feedback may be provided without verification. Other feedback provided from verified friends/employees/acquaintainces may be identified as such while still remaining anonymous. Verification may also be determined using a friend or other association request. For example, an entity may be asked to confirm that "Bob" is an employee or friend.

With reference to FIG. 1 the system has a group of registered users 2. Each registered user typically has his or her own personal computer 4, and a connection to the internet 5 via modem. The system ACS 6 (Anonymous Comment System) may include a server 8 (CPU), a database 10, and the system application having a registration module 12 (REG MOD), a rating module 14 (RATING MOD) and a comment module 16 (COMMENT MOD). Suitable software programming, relational databases, and hardware to run the system would be well known to those of ordinary skill in the art.

Figure 4:
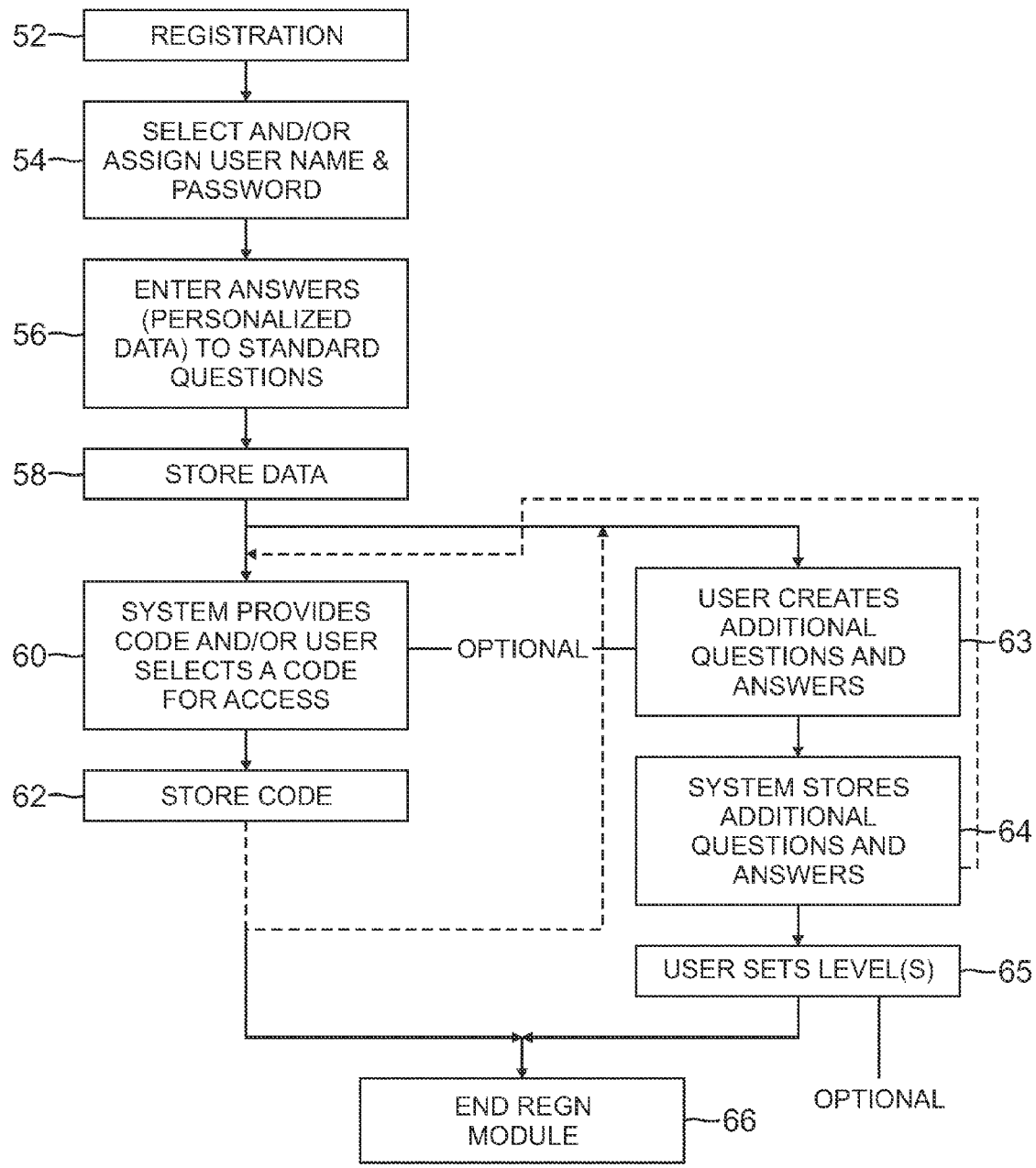
FIG. 4 is a flow chart of registration steps in the method.

With reference to FIG. 2, the database preferably includes registered users 2, their respective answer sets 18, to standard system questions, additional questions sets 20, and additional answer sets 22 (to the additional questions). The thresholds 23, as explained in FIG. 4, are optionally determined by the registrant and needed to provide a comment. These levels such as A1, B1, C1; A2, B2, C2; ... ; Ai, Bi, Ci; ... ; An, Bn, Cn are stored in the system. These may be numbers or percentages of right answers required, and there may be one threshold or multiple thresholds. These may be set by the registered user or system set. They may be percentages or absolute numbers.

The system also may preferably store a user's rating 24, e.g., CR3, CRn, for any other user. CRn is a rating for user "n," and CRi is a rating for user "i," etc. the ratings need not be stored, and users could have to answer questions each time they wish to connect to and provide comments to another user.

Figure 3A:
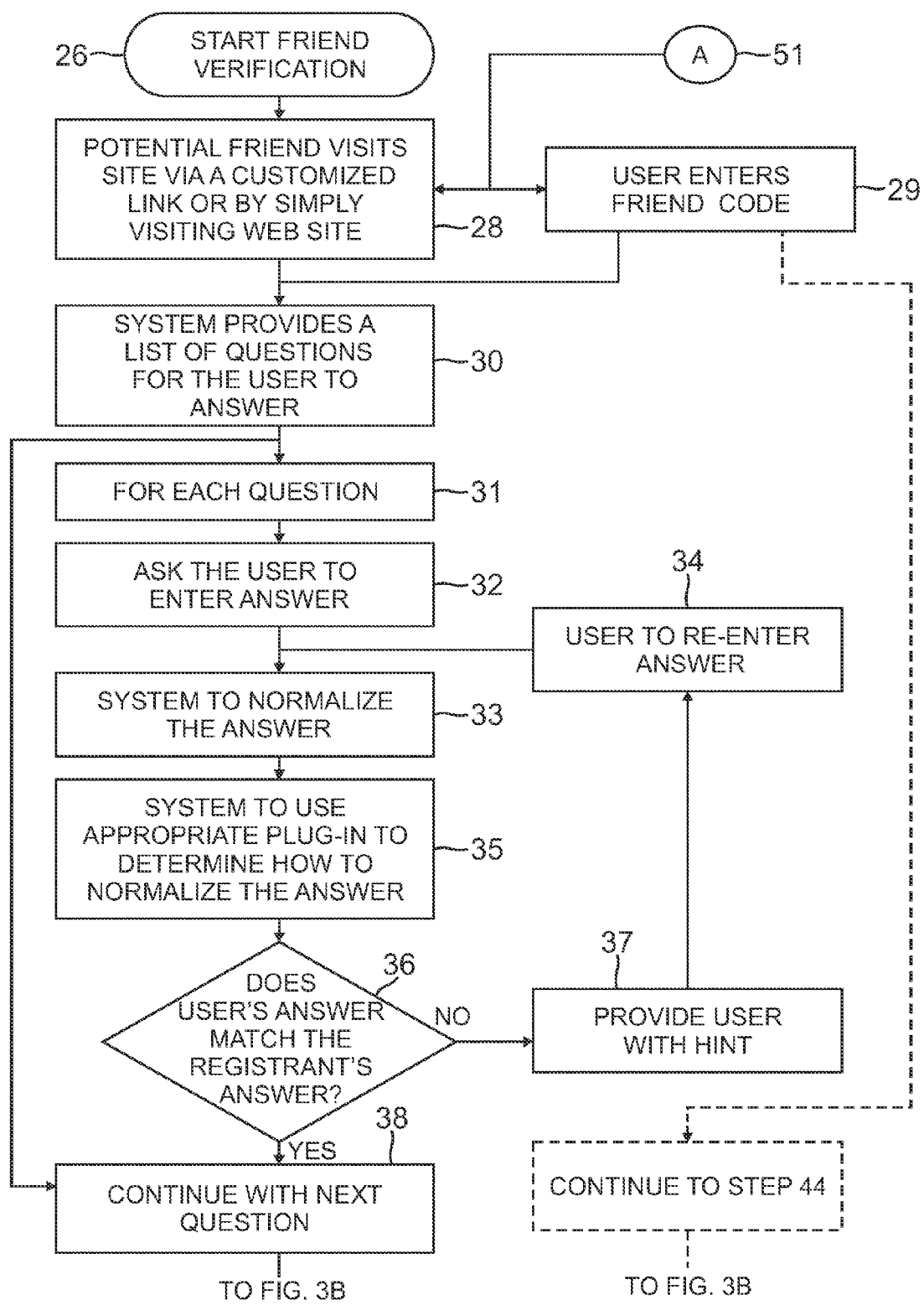
FIGS. 3A, 3B, and 3C are a flow chart of steps in a method for the stem of FIG. 1.
Figure 3B:
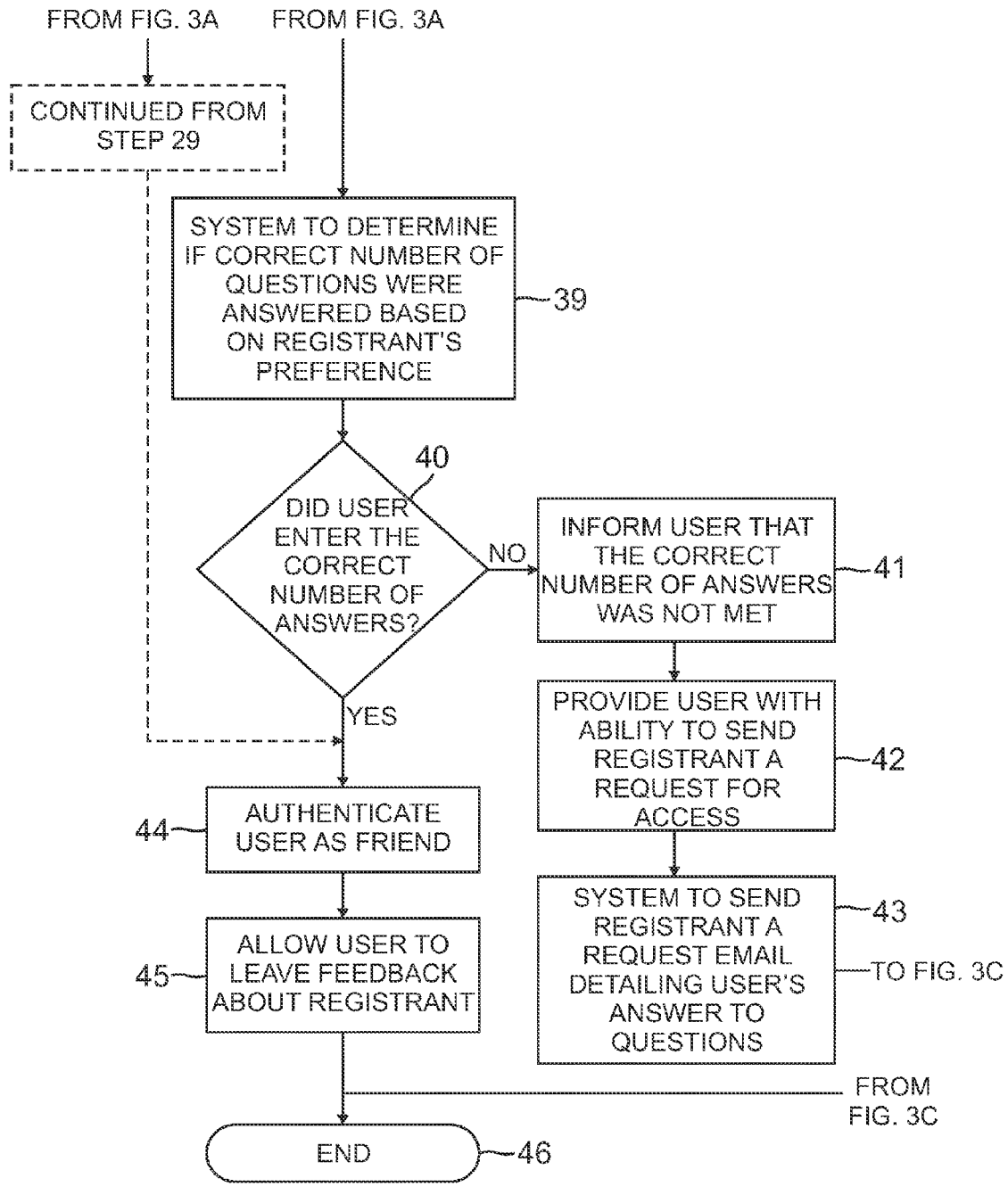
Figure 3C:
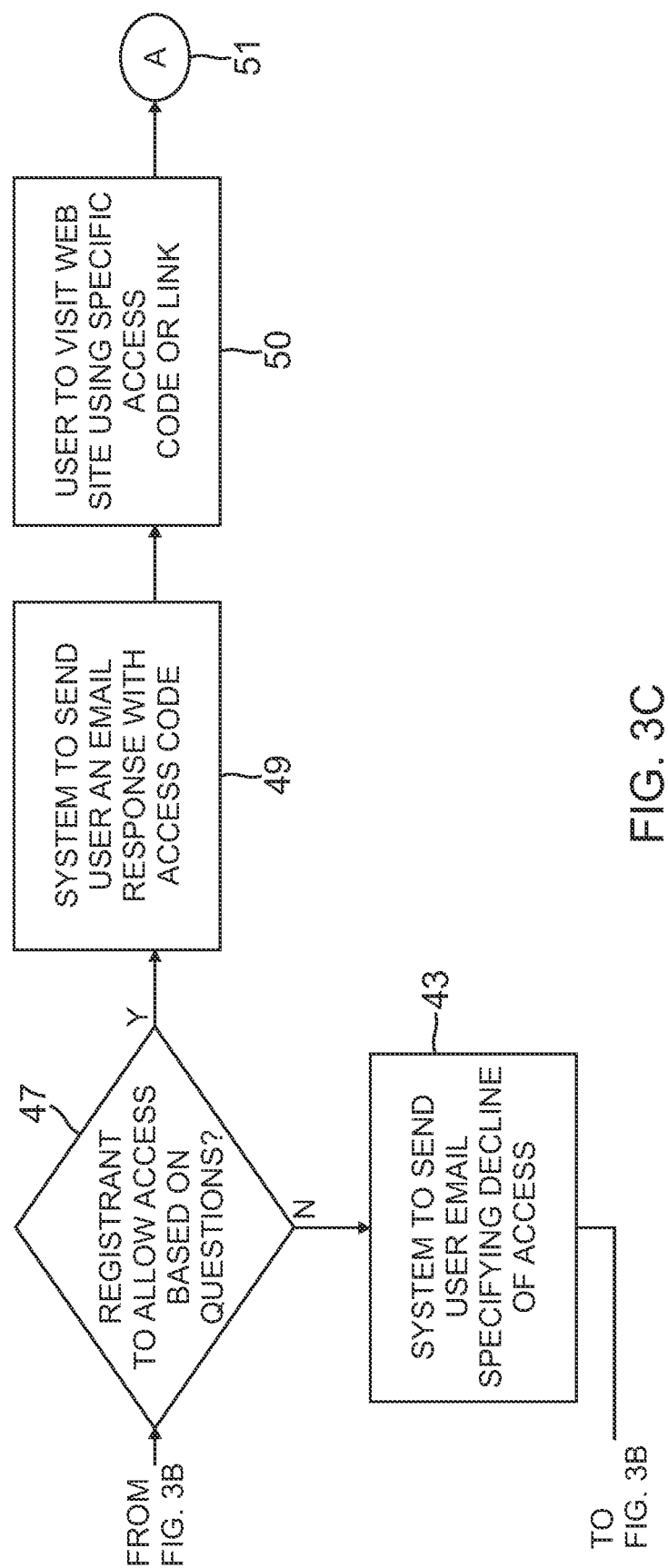

FIGS. 3A, 3B, 3C show an example of the verification (or rating module) to determine the user's rating and therefore whether or not the user may connect to a target registered user, and leave comments. The steps are as follows:

As shown in FIG. 3A, first a friend verification process is started at step 26. In the second step 28, a potential user or an existing user can potentially connect with another user. The next step 30 is for the system to provide a list of questions for the user to answer. For each question 31, the user is asked to provide an answer 32. The system then normalizes (at step 33) the answer as discussed earlier. The next step 36 is for the system to check if the answers match the registrant's answers. If the answer is yes the system will allow the user to continue (step 38) to the next question. If the answer is no the system provides the user with a hint (step 37) and asks the user to re-enter the answer at step 34. From there, steps 33 and forward are repeated.

Steps following step 38 of FIG. 3A are shown in FIG. 3B. After the questions are asked, the next step 39 is for the system to determine if the correct numbers of questions were answered based on the registrant's preferences and at step 40 if the user entered the correct number of answers (i.e., got enough answers correct). If the answer is yes, the system authenticates the user as a friend at step 44 and then allows the user to leave feedback about the registrant at step 45. If the answer is no, the user is informed that the correct number of answers was not met (step 41) and provides them with the ability to send the registrant a request for access at step 42. The system then sends the registrant the request email detailing the user's answers to the questions (step 43).

FIG. 3C continues from step 43 of FIG. 3B. The registrant receives the email and decides whether or not to allow access based on the questions at step 47. If the answer is no, the system will send the user an email specifying the decline of access at step 48. If the answer is yes, the system will send the user and email with an access code at step 49. The next step 50 is for the user to visit the website and use the code. This is shown as point A on both FIGS. 3C and 3A.

With reference to FIG. 3A, the user starting at point A enters the friend code shown at step 29 and will be taken either through step 30 and so on or will be automatically advanced to step 44 of FIG. 3B where the code can be authenticated. This depends on the situation and the registrant's preferences. If users leaving comments are required to have an access code, then the user will be taken to the verification questions upon entry of a correct access code. If the user has already answered the questions and has not met the requirement, but has been given a bypass code, the user will be allowed to leave comments as soon as the they enter a correct bypass code.

The system, in an embodiment, can be such that anyone can use the site to potentially connect with a registered user, so that the potential user need not pass through the registration module before providing comments. Therefore, the below scenarios can work with either registered users or non-registered users who provide comments.

With reference to FIGS. 3B and 3C, in a first scenario, a girl wants to tell her friend she has a crush on him but cannot do so face to face. She provides comments to the friend, who is registered in the system. She takes the verification test (described below) and fails to pass the verification (of FIGS. 3A and 3B), perhaps due to nervousness, by failing to enter the threshold number of correct answers to get to leave comments. The system informs her that the correct number (or percentage) of answers was not met. The system may then provide her with the ability to send the registrant a request for access. The system may then send an email to the registrant with a request that a user wants to provide comments, but failed to meet the threshold. The email may detail the registrant's questions and the answers provided by the user. The registrant can turn down access and the system may then send an email to the user indicating that the registrant denied access. If the registrant allows access, the system may send the user an email with the access code to bypass the verification questions. The user returns to the web page for access and uses the code (going from FIG. 3C, point A on the chart to FIG. 3A point A). The user then enters the friend's access code and she may anonymously tell the registrant that she has a crush on him, and enter into further dialog with the registrant via anonymous email. Through these emails, the user may disclose her identity if she chooses to do so.

In another scenario, a professor asks his students to give their honest opinion of him or her or the course, but written or oral replies do not result in honest opinions. The professor then registers on the system, and gives each student a code to be able to go directly to giving comments (by skipping directly to the "Authenticate user as friend" step 44 shown in FIG. 3B). That is shown by the "user enters friend code" box (step 29 in FIG. 3A). Each student may then provide comments bypassing the level assignment portion of the module.

An example of system use depending on a code or on verification questions may be as follows:

A large corporation has found that its sales are dropping and wants to know more about the managers and personnel, so the corporation asks all employees and tell their thoughts about their superiors. The corporation does this by having all supervisors register and obtain a "friend code." Then the corporation sends an email invitation to all employees with the "friend code" or has each supervisor send emails having the "friend code" and soliciting comments using the system. The emails are to be sent to each employee in the supervisor's charge. Alternatively, the corporation may register one person to receive all comments regardless of the supervisors whom the comments are about.

In the question verification module of FIGS. 3A and 3B, the user (whether registered or not) visits the system web site and selects the registered user to which to connect. Then the system provides a list of questions about the registrant to the user. For each question, the user enters an answer and then the system normalizes the answer, using a plug-in software (e.g., a spell checker, etc. as mentioned above, and/or using custom designed software as would be evident to one of ordinary skill in the art). The system then asks: "Does the user's answer match the registrant's answer?" If not, the system may provide hints (if the user has provided hints or if the system provides format hints). It is noted that the database of FIG. 2 would store any user hints too in association with the registered user, while format hints if system-generated rather than user-generated, could be stored elsewhere. Upon receiving a hint or hints, the user may re-enter the answer. The system would again perform normalization and compare the user's answer to the registrant's answer. The user continues with the next question. In addition, the flow chart can also be modified to provide a step where the time to answer times out or otherwise is wrong, and no additional hints are available, in which case the system goes to the next question.

After all questions are answered (or timed out), the system determines if the number correct passes the threshold, and if not, the system re-enters the loop that informs the user that the correct number of answers was not met, and gives the registrant a chance to approve the user anyway and provide an access code. If the correct minimum number of answers (or percentage) is met, the system authenticates the user as a friend, and allows the user to leave feedback or comments about the registrant.

Figure 7:
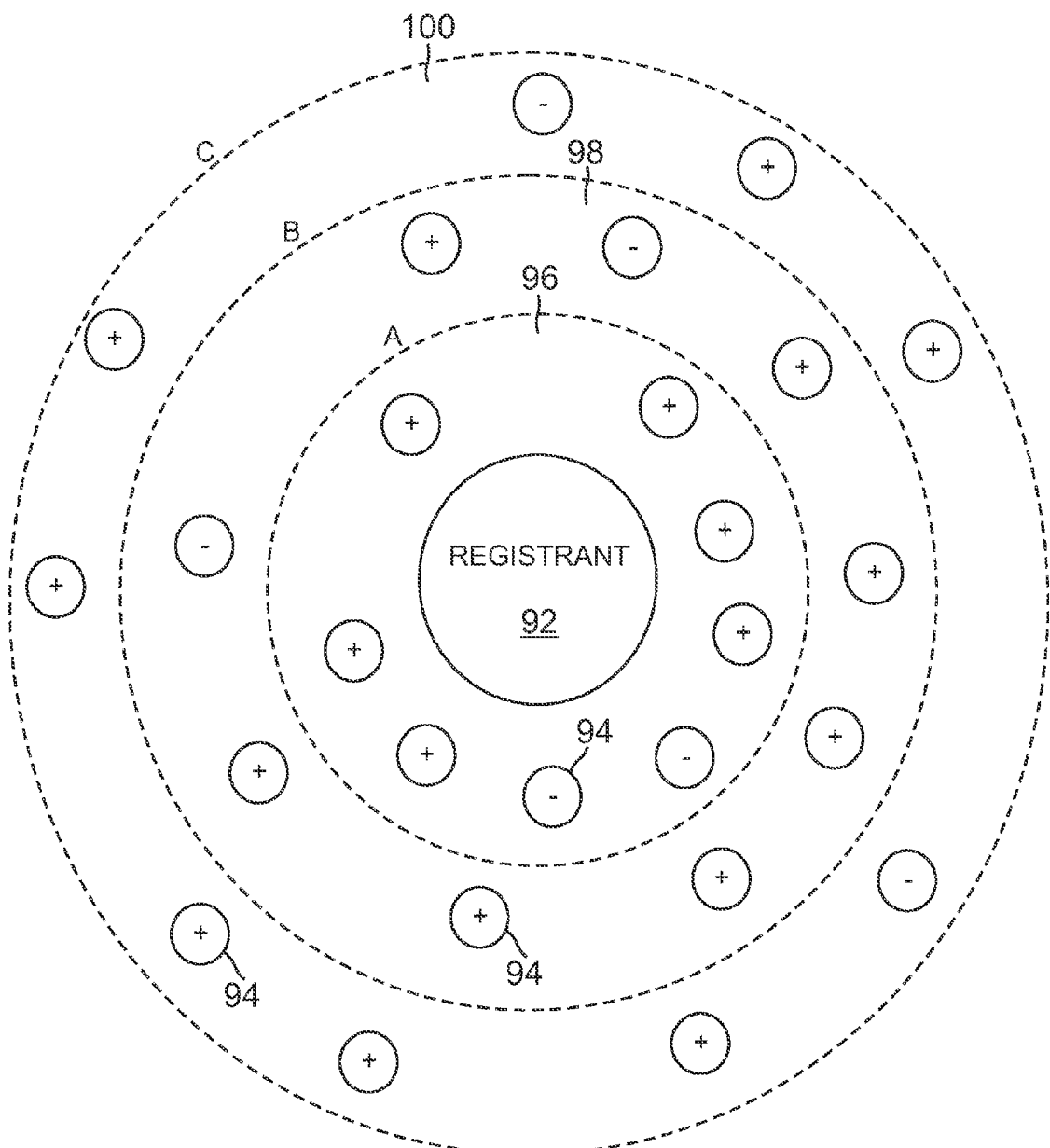
FIG. 7 is a diagram of an example of feedback provided to a registrant in a tiered or graded system in accordance with one embodiment of the invention.

The system may be a tiered system with level classification as shown in FIG. 7. The system provides the registrant 92 with the user's comments 94 along with the user's level of closeness. Levels A, B and C, labeled 96, 98 and 100 respectively are shown as examples. Any number of levels may be used. Level A is the first and highest level of closeness followed by B and then C. The user's level of closeness or the user's authentication as friend may be stored in the memory as noted above, possibly for a limited time, e.g., three months. This allows the user to determine the relevance of the feedback he is given. If mostly positive comments are given by those in Level A, but mostly negative comments are given by Level C, he can determine that those who are close to him, or really know him, gave him positive and/or significant feedback. However, if the opposite were true and those closest to him gave mostly negative comments, this may be cause for concern. Generally comments in Level C would not be considered as relevant as comments in Level A. In order to provide this information either the user is a registrant too, or users have a limited registration, such as just an email and password, and the closeness level or authentication is stored, preferably for a limited time, or until the registrant updates his or her answers and/or questions. The access code may also have a limited life.

The system may also provide feedback in any of a variety of other ways in conjunction with "familiarity" rating and/or independent of familiarity, although familiarity is preferred.

Registration Process

A user or registrant first registers on a group or network of other users. As shown in FIG. 4, registration preferably includes entry of the following data:

user name and password selection 54 (a user name can be the registrant's name, email address, a pre-existing user name such as a user name on an existing internet server, email service, or existing network or social network such as a user name on www.myspace.com, or a newly selected, preferably unique, user name, as is commonly done on a multitude of internet sites; and entry of personalized data 56, such as name (e.g., first, middle and last), home address, birth, city and state, birth hospital, date of birth (DOB) age (which can be derived from DOB), years at current home address, employer, supervisor name, whether or not the registrant owns pets, if so, pets' names and animal type (e.g., fluffy, cat; rover, dog), and/or number of dogs owned and/or number of cats owned, high school attended, city and state of high school, year of graduation, college(s) attended (if any), degree(s), year(s) degree(s) achieved, favorite color, favorite hobby, favorite sport, and/or other personal and/or business information, such as marital status, spouse's name, prior spouses' names, if any, children's names, genders and ages, number of children.

The personalized data is requested by the system preferably in the form of a questionnaire. The set of personalized data can vary depending upon a purpose of the group network, e.g., whether the network is purely social, whether the network is for business associates, a set of customers or clients, a set of employees in a business, or a set of members in a social club, professional association or other type of association. As an example, a set of lawyers in a law firm might have questions such as what year did you join the firm?, what is your practice specialty?, what are three current cases that you are working on?, what is your assistant's name?, what is your extension number?, what are your usual work hours?, who are your three biggest clients?, etc., as well as some of the data mentioned above. What is important is that the data set be one that enables a reasonable assessment of how close a "would be" (prospective or potential) anonymous commenter is to the registrant. This means that there must be sufficient questions to enable a gradation, even if there are just two gradations, such as close and not close.

Optionally, the system can be set to preclude comments from being communicated or passed to the registrant if the person is not within the closest category or at least a category having a desired level of closeness.

The gradations should, preferably, be selected, depending upon the size of the group and the type of group, and possibly other factors, to avoid indirectly identifying an individual commenter. As noted below, the "gradations" could simply be the number of correct answers, or a score where some questions count one point while others may count two points, if the information is more personal.

The system preferably would have a method of updating the questionnaire answers of the registrant. Some answers may be automatically updated by the system, such as age (incrementing by one each time the data equals the DOB).

Next the system can store the data 58, and may perform normalization, spell checking and the like at this stage. The answers are preferably stored. After storing answers to a standard set of questions (which could be skipped in an alternative embodiment), the system would then optionally either give a would be registrant a choice to provide an access code by which other users can simply enter and bypass any verification 60, or the would be registrant may create additional questions 63 and provide answers, which would then be stored 64. The access or bypass codes would also be stored 62, also shown in FIG. 2, e.g., COD1, COD2, . . . , CoDi, . . . , CODn. Both access codes and acquaintance verification may be provided as requirements for connection (authority) to leave comments or just one of access codes and acquaintance verification. For acquaintance verification (using questions) the registrant may set the threshold level(s) 65 e.g., the percentages or minimum amount right for authorization (e.g., A, B, C), or the system may set these.

When feedback has been left, the feedback is preferably graded according to the number of identifying questions answered correctly. This means that feedback would be accompanied by a grading level that would allow the user to determine how credible the feedback is. As an example, if there are ten (10) qualifying questions, a grade of ten (10) would mean that the user answered all questions correctly. A grading of five (5) would mean that the user leaving the feedback got five (5) questions correct. This grading system may preferably allow the registrant to set a weight for each question, so some questions can be more important than others. For example, knowledge of birth hospital may have a bigger weight than birth date because anyone knowing birth hospital is probably more intimate with the registrant.

When receiving feedback, the registrant will also be able to determine the level of feedback desired and can even control the level that users can leave. If a user chooses to see feedback of a certain level, e.g., at least a level seven (7) on a ten question scale of 1 to 10, or any other preset scale, then users who leave feedback that does not grade 7 or above will be informed that their feedback will not be seen under the current user preferences. The feedback will be stored by the system, but not be visible. A registrant will also be able to determine whether feedback should be stored if insufficient. If stored, the system preferably will remind the registrant of stored but un-reviewed feedback, e.g., at regular intervals based on the registrant's preferences.

Figure 5:
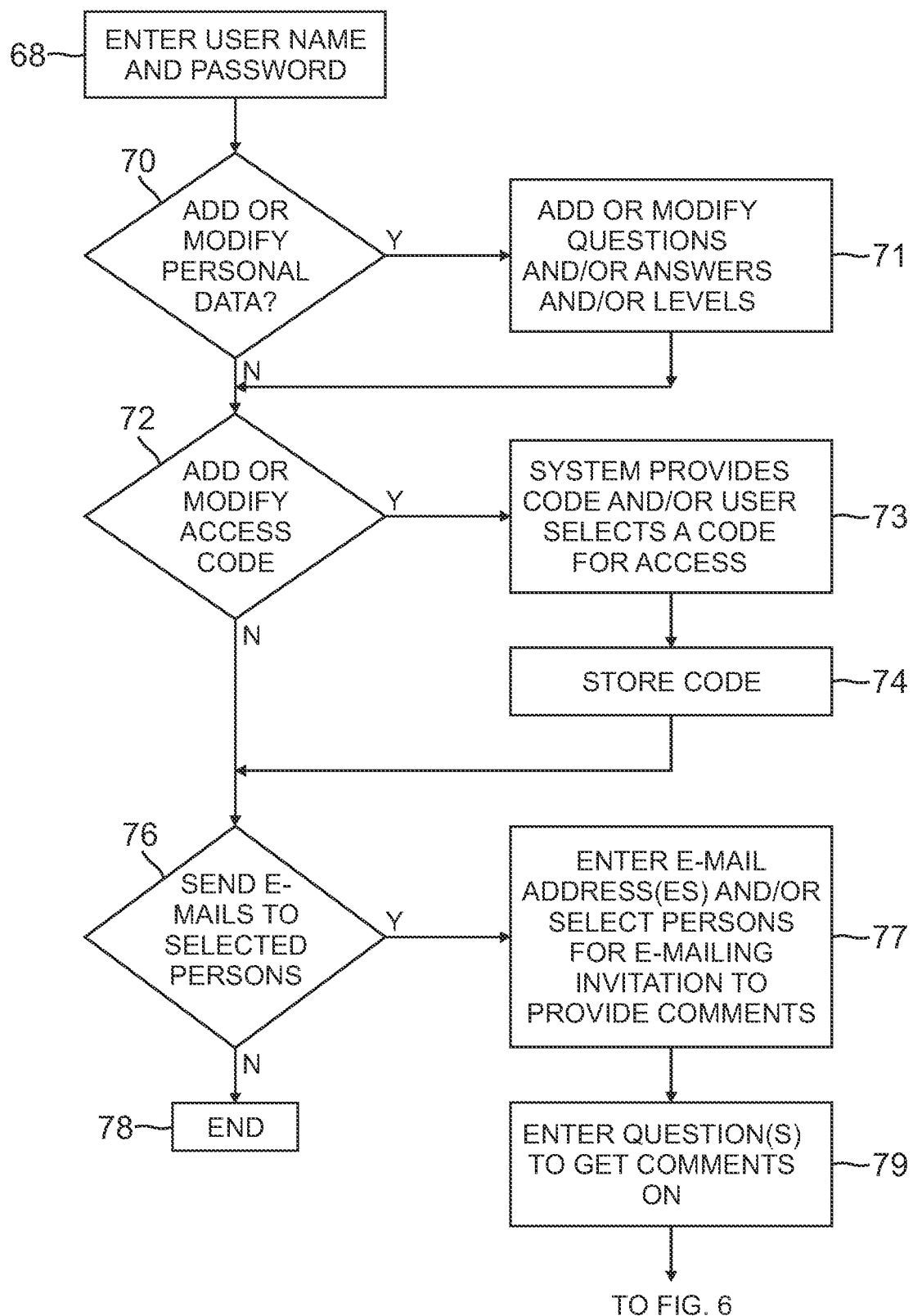
FIGS. 5 and 6 are a flow chart of steps in creating and/or managing a registrant's profile in a system such as that of FIG. 1.
Figure 6:
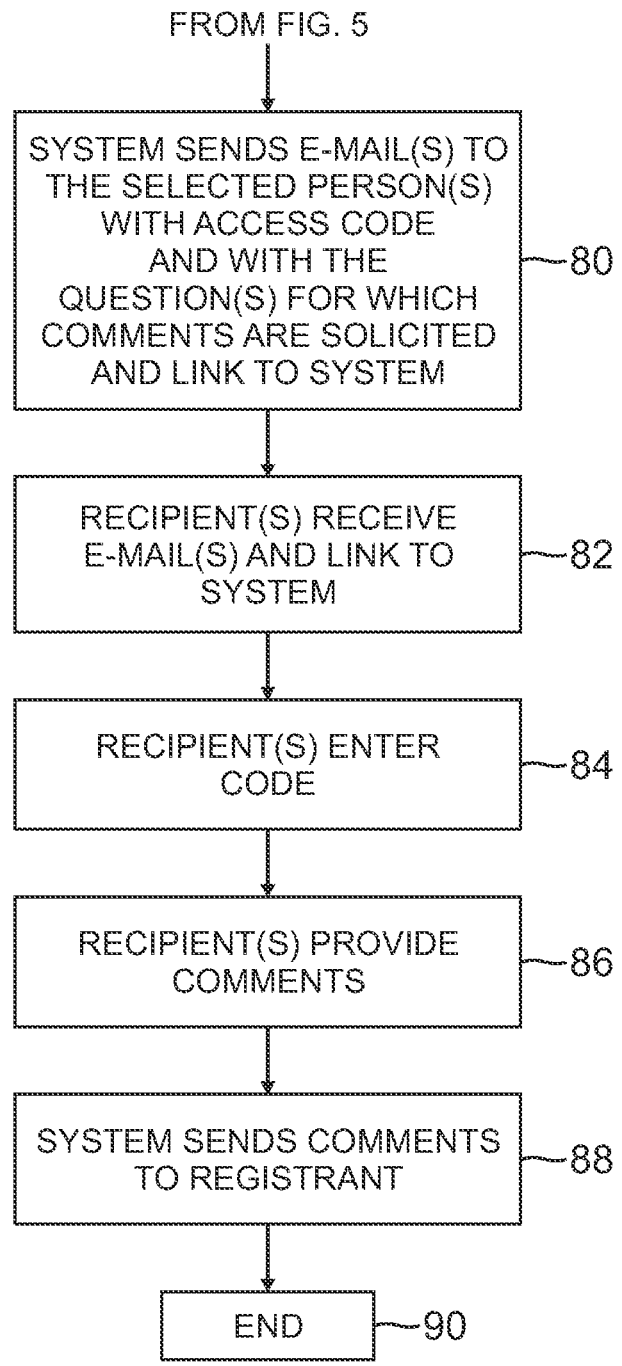

Once the registrant has gone through the process of creating a "profile" he may then go back and edit it as shown in FIGS. 5 and 6. The user starts by entering a username and password at step 68. The user is then asked if they would like to add or modify their personal data at step 70. If the answer is yes the user may add or modify questions, answers and levels of closeness at step 71. The user is then asked if they would like to add or modify their access codes at step 72 (if the answer to the previous question is no the user is automatically taken to step 72). If the answer is yes the system provides codes and/or the user selects codes for access at step 73. The codes are then stored at step 74. The next step 76 is to ask the user if they would like to send E-mails to selected persons (if the answer to the previous question is no then the user is automatically taken to step 76). If the answer is no the editing process is completed. If answer is yes the user will then be asked to provide the email addresses of the persons for emailing the selected users invitations to provide comments at step 77. The user can then enter questions to get comments on step 79. The system then sends emails to the selected person with access codes and with the questions for which comments are solicited and a link to the system is also provided at step 80. The recipients receive the emails at step 84 and provide comments at step 86. The system sends the comment to the registrant at step 88 and the process is completed.

ADDITIONAL EMBODIMENTS

Figure 8:
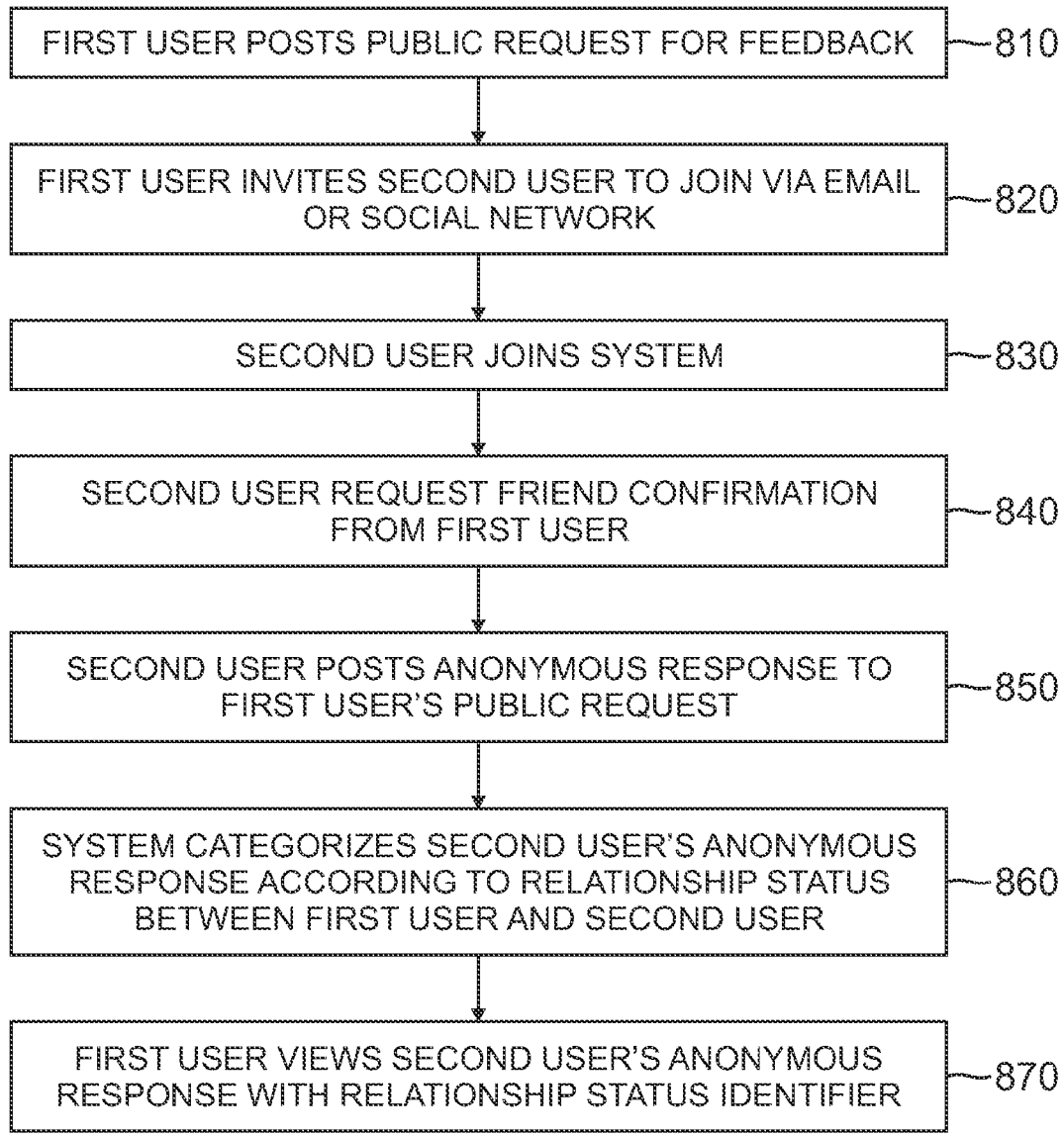
FIG. 8 is a flow chart of operations for providing anonymous feedback, according to an embodiment.

FIG. 8 is a flow chart of operations for providing anonymous feedback, according to an embodiment. In operation 810, a first user uses the system to post a public request for feedback. The question may involve general topics such as politics, relationship advice, work related questions, or any other topic. Some examples might include requests for opinions about whether someone is late too often, what people think about a new boyfriend, what people think about a new article of clothing. The question, and the identity of the first user, may be publicly available. In some embodiments, the first user may not need to ask a question at all, and unsolicited anonymous feedback may be posted for the first user.

In operation 820, the first user invites a second user to join the system via email or a social network. Joining the system may be either unnecessary or a prerequisite for providing anonymous feedback. The invitation to join and/or to provide anonymous feedback for the first user may be delivered via email or a social network (e.g., Facebook®). The second user may then become a registered user of the system by being directed to a website for the system. In other embodiments, the second user may become registered by accepting installation of an application for the social network. The second user may be registered using their social network information, or they may create a new login.

In operation 830, the second user joins the system.

In operation 840, the second user requests confirmation of friendship with the first user, who is prompted by the system to confirm or deny friendship and/or another relationship with the second user. For example, the second user may select from a drop down menu whether the first and second users are friends, colleagues, family, or acquaintances, and the first user may be asked by the system to confirm the second user's selection.

In some embodiments, the relationship between the users may be established based on existing relationship information found within the first and second user's social network information. In other embodiments, the relationship between the users may be determined by the successful invitation of the first user to the second user to register with the system (e.g., the second user is a confirmed friend of the first user).

In operation 850, the second user posts an anonymous response to the first user's public request. In embodiments where a public request is not needed, the second user can post unsolicited anonymous feedback for the first user.

In operation 860, the system categorizes the second user's anonymous response according to the relationship status between the first user and the second user. The system may mark the anonymous post with a status indicator to provide the first user with a mechanism for evaluating the feedback. The status indicator may state the type of relationship between the first and second user. The status indicator may be displayed publicly, or shown only to the first user. In some embodiments, the first user may be able to sort and/or search for feedback based on the relationship status between the first user and the second user. As listed, operation 860 occurs after operation 850, but the operations may be performed in any order that is logically permitted, and operation 860 may occur prior to operation 850.

In operation 870, the first user views the second user's anonymous response according to the relationship status between the first user and the second user. In some embodiments, the second user's response is displayed publicly. In other embodiments, the first user must approve the feedback in order to have the anonymous response be posted publicly.

In some embodiments, before the first user can view the feedback and/or view a confirmed relationship status for the second user, the system may require that a threshold number of users in each relationship category exist or that a question is posed to a threshold number of persons to whom a question is posed, in order to preserve a responding user's anonymity. For example, if the first user only has one confirmed family member, the system may hide the feedback from the first user, hide the relationship status of the second user, or prevent the second user from providing feedback until additional persons in that relationship category are invited to comment by the first user.

Figure 9:
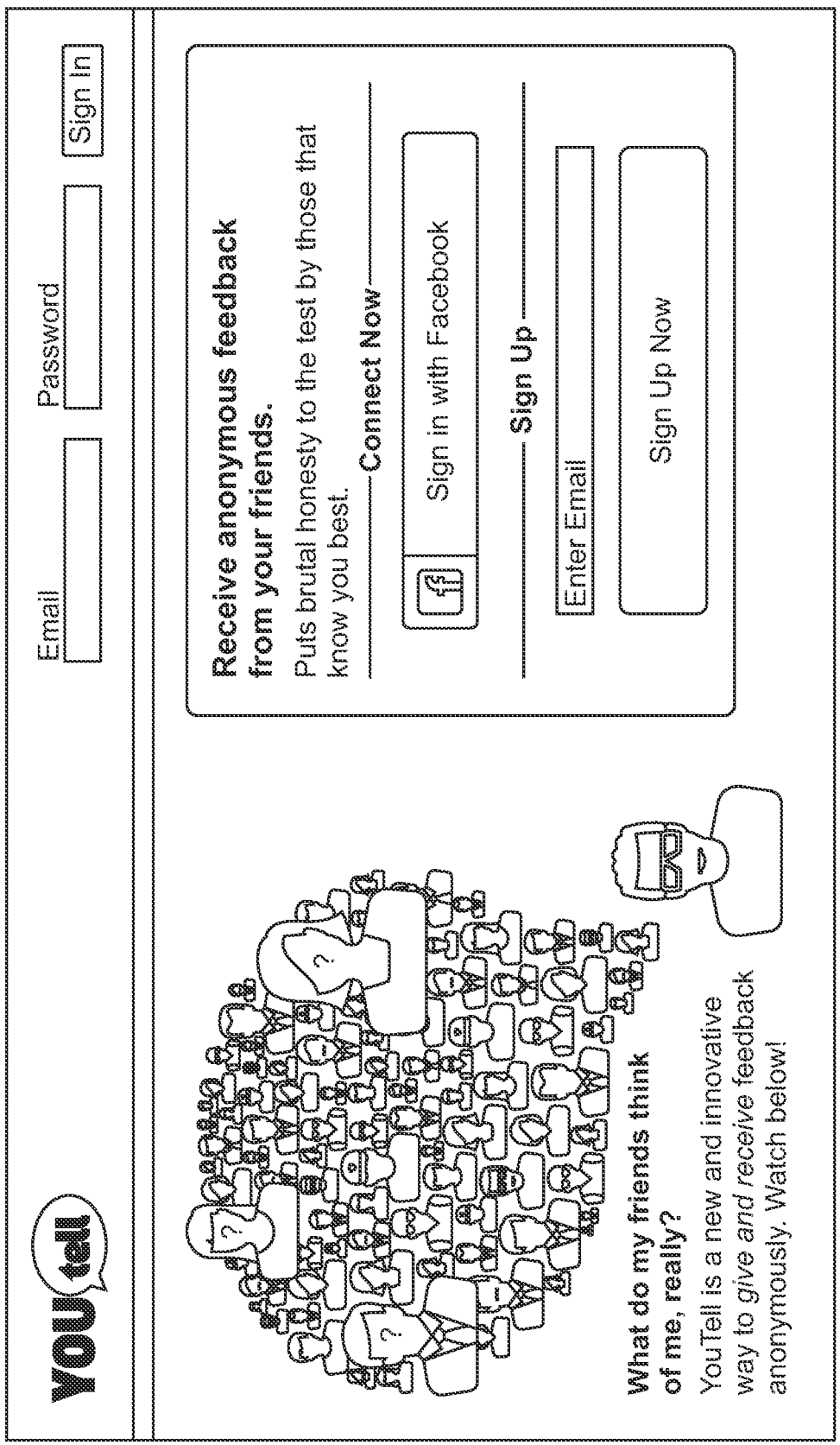

FIGS. 9 through 16 are illustrations of various user interfaces, according to an embodiment. FIG. 9 illustrates an initial login or registration page for the system. A user can login using a customized login and password, or by using their Facebook information.

Figure 10:
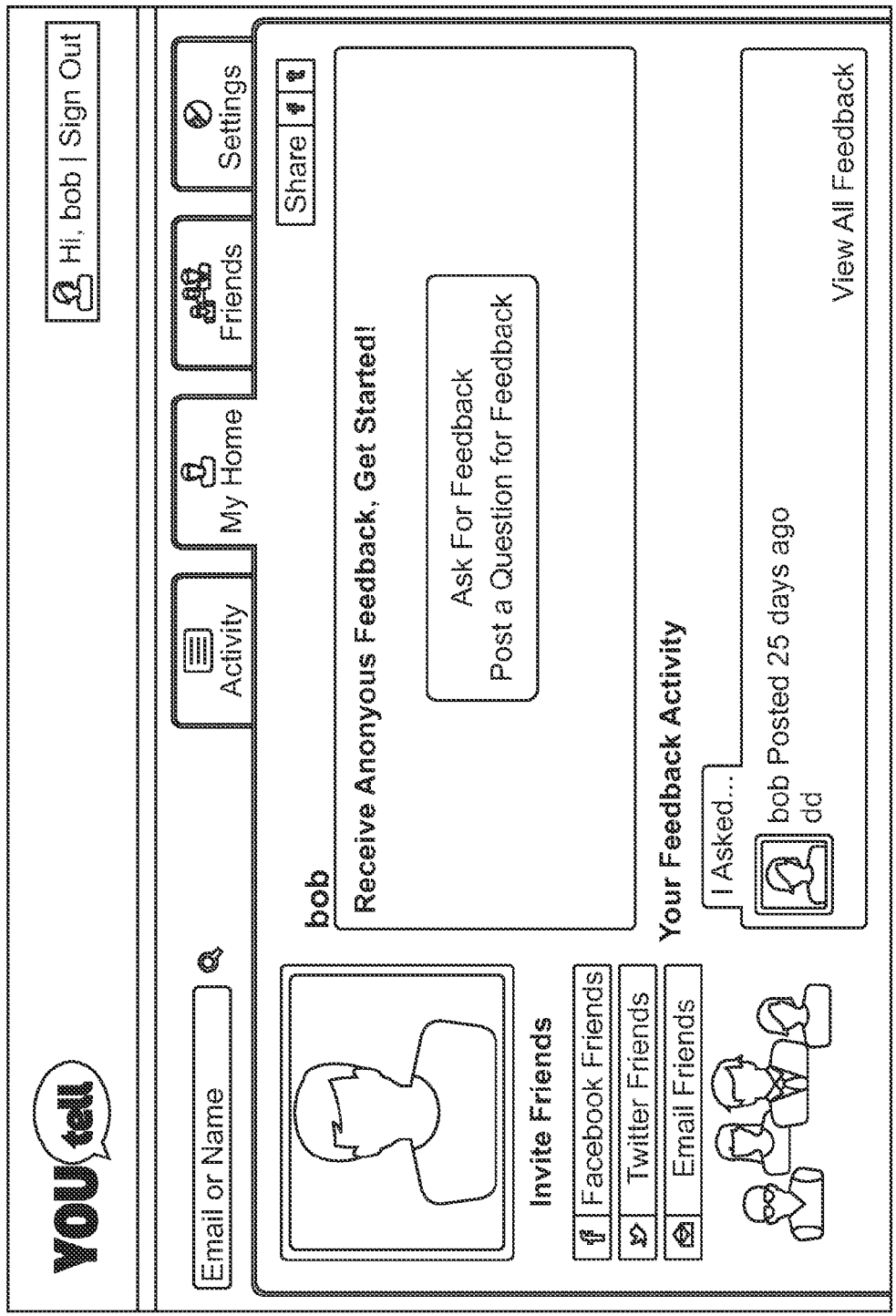

FIG. 10 illustrates a home tab for requesting anonymous feedback, according to an embodiment. The home tab permits the user to invite friends to participate in the system, ask a question to generate feedback, or share one or more of the user's questions and/or responses to generate feedback.

A successful invitation and/or friend request to a registered user may be sufficient to allow the users to provide feedback to each other without asking for further verification of the relationship. Alternatively, verification questions may continue to be asked in order to categorize the feedback even if a relationship between the users has already been confirmed.

The user can pose a question to be answered by clicking on an ask button of FIG. 10.

In other embodiments, an additional button (not shown) may be provided that allows a user to give feedback.

The home tab may also display the feedback activity for the user with respect to feedback that was asked for, feedback that the user provided, and feedback that the user received. The user can invite friends to receive the questions that are posed by the user by clicking on a Facebook, Twitter, and/or Email button, which may then prompt the user to provide access information to the user's Facebook, Twitter, and/or email accounts so that the system can invite the user's contacts.

The existing feedback activity for the user, such as previous questions that were posed, responses, and/or unsolicited feedback, can be shared by the user via social networks such as Facebook and Twitter.

Feedback may be provided or received in the form of text, photographs, emoticons, links, or video.

Figure 11:
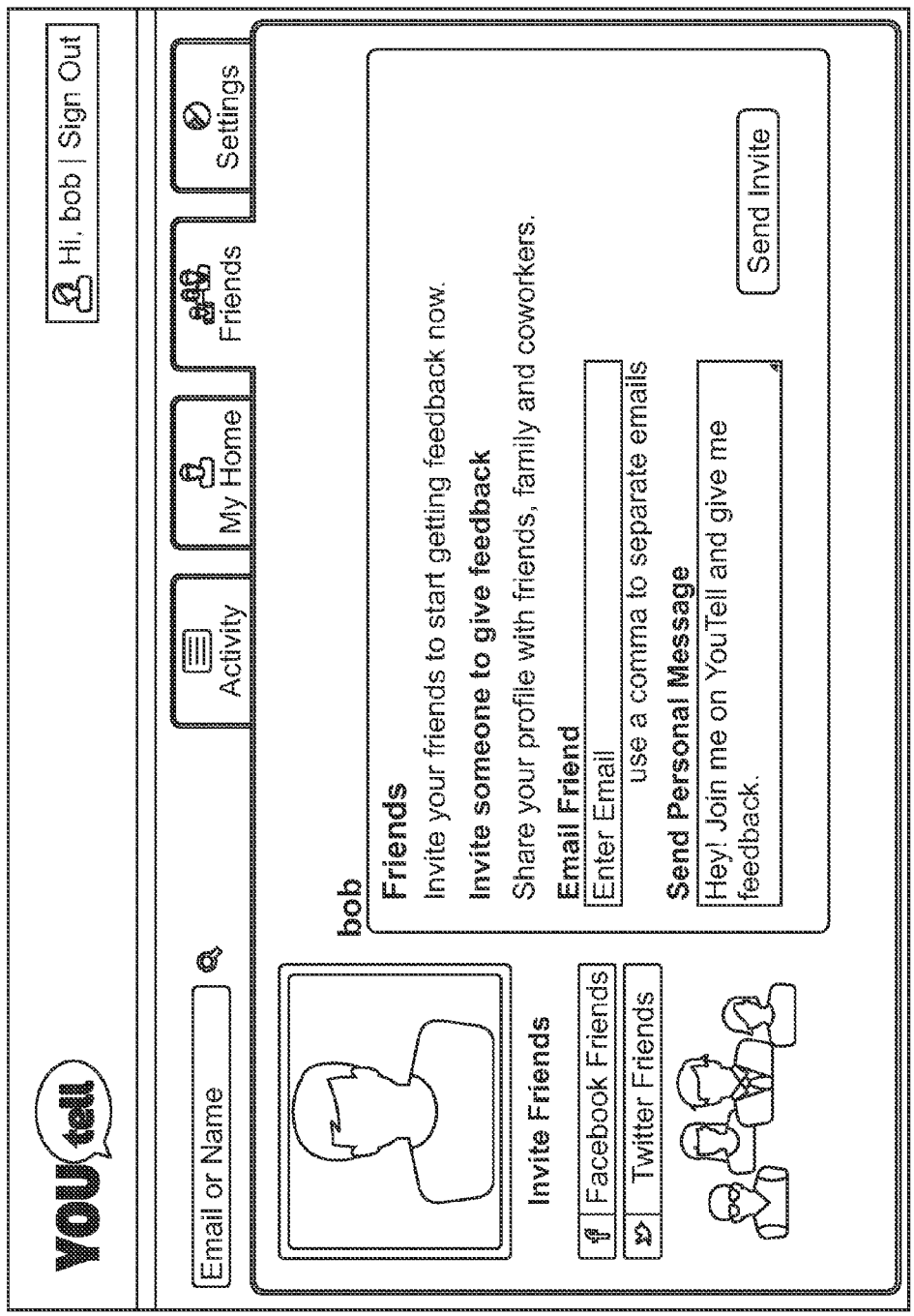

FIG. 11 illustrates a friends tab, according to an embodiment. From the friends tab, the user can enter a user's email address and a personal message to invite the friend to view the user's profile. The email address may be for friends, family, and/or coworkers.

Figure 12:
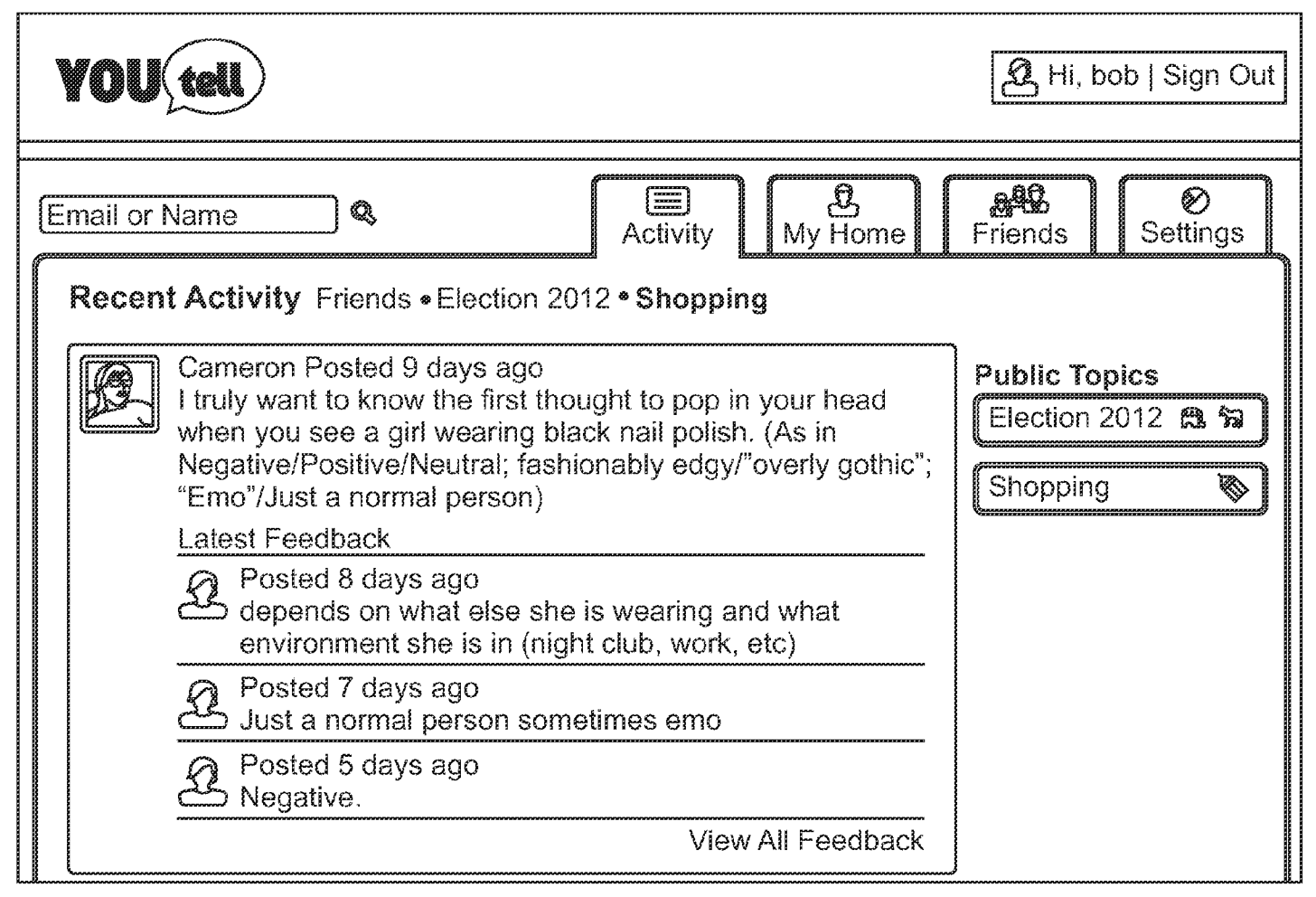

FIG. 12 illustrates an activity tab, according to an embodiment. The activity tab may show recent activity for various topics. The user may select between public and private topics, which are listed at or near the top of the screen. For example, the user may be able to select between topics for friends, Election 2012, and shopping. The activity tab may include a list of public topics at a side of the screen. Additional possible topics may include: politics, shopping, fashion, dating, food, entertainment, health, sports, travel, and technology.

Recent activity may be questions posed publicly by registered users as well as the anonymous responses that were generated. From the friends list, questions posed may be from confirmed friends of the user who is viewing the questions and answers. For public topics, the questions that are posed may be from any registered user of the system. For each answer, if the answering person has a relationship with the user viewing the answer, the system may provide a relationship status, whether or not the answerer has any relationship with the person who initially asked the question.

Figure 13:
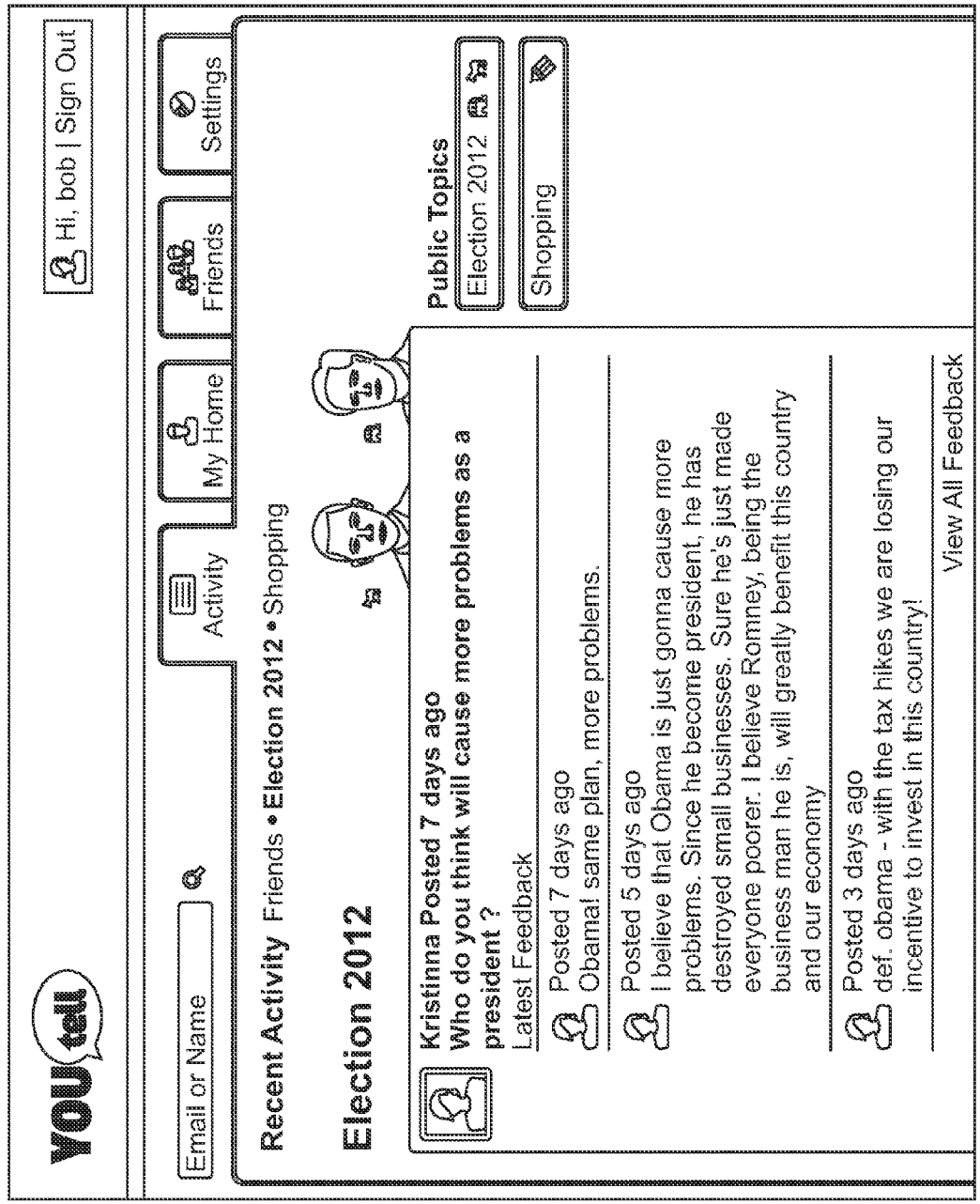

FIG. 13 illustrates a view of a public topic of "Election 2012," according to an embodiment.

Figure 14:
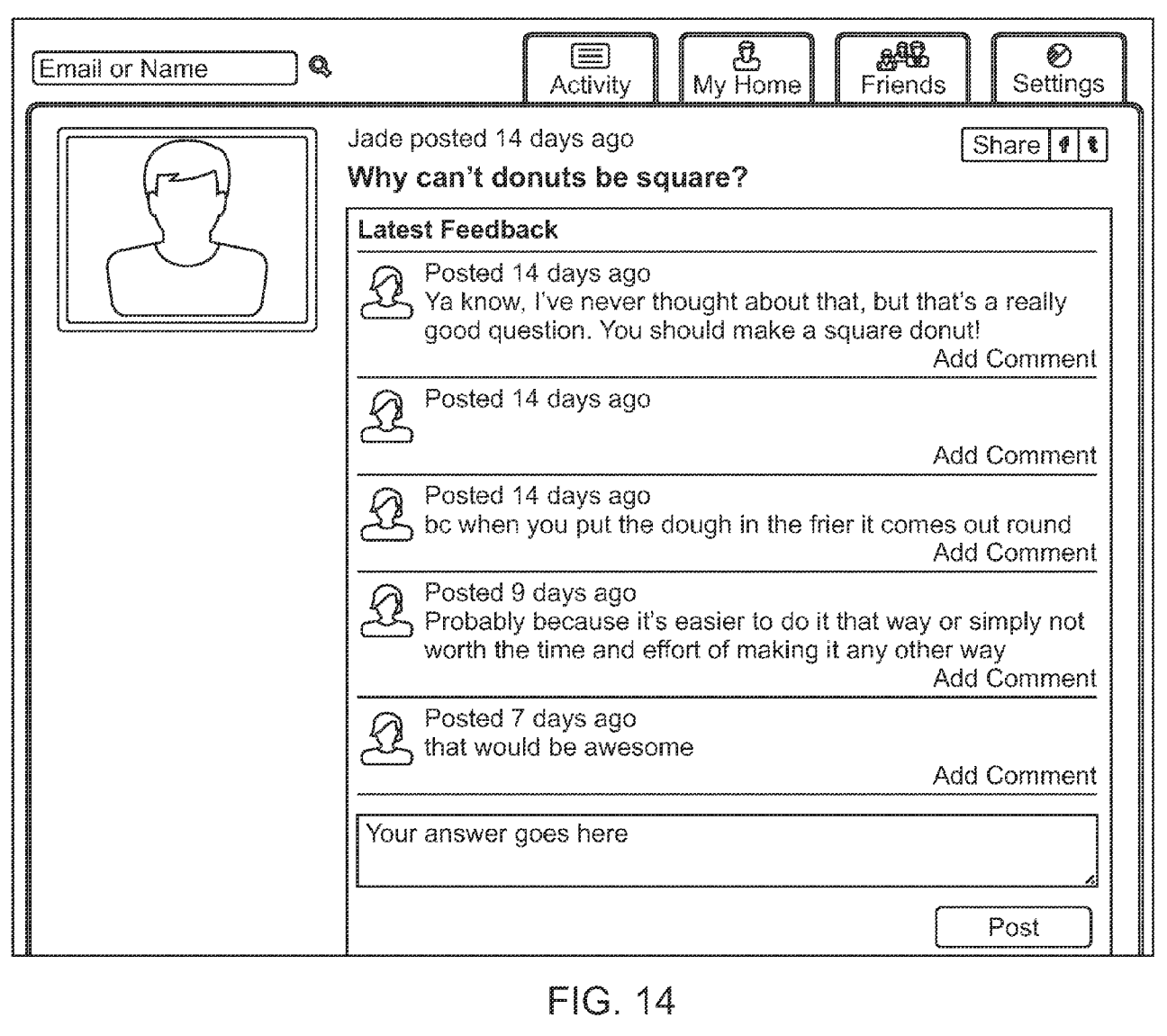

FIG. 14 illustrates a view of a public topic where additional feedback can be provided, according to an embodiment. The user viewing the question and/or answers can post feedback to the question and/or provide a comment on a previous response. The system may ask how the user is associated with the person who asked the questions, and may verify the relationship by asking one or more questions. Alternatively, the system may allow the user to simply answer the question. If a relationship exists between the user and the person asking the question, the system may provide the asker with a relationship indicator next to the answer that is provided anonymously via the system.

Figure 15:
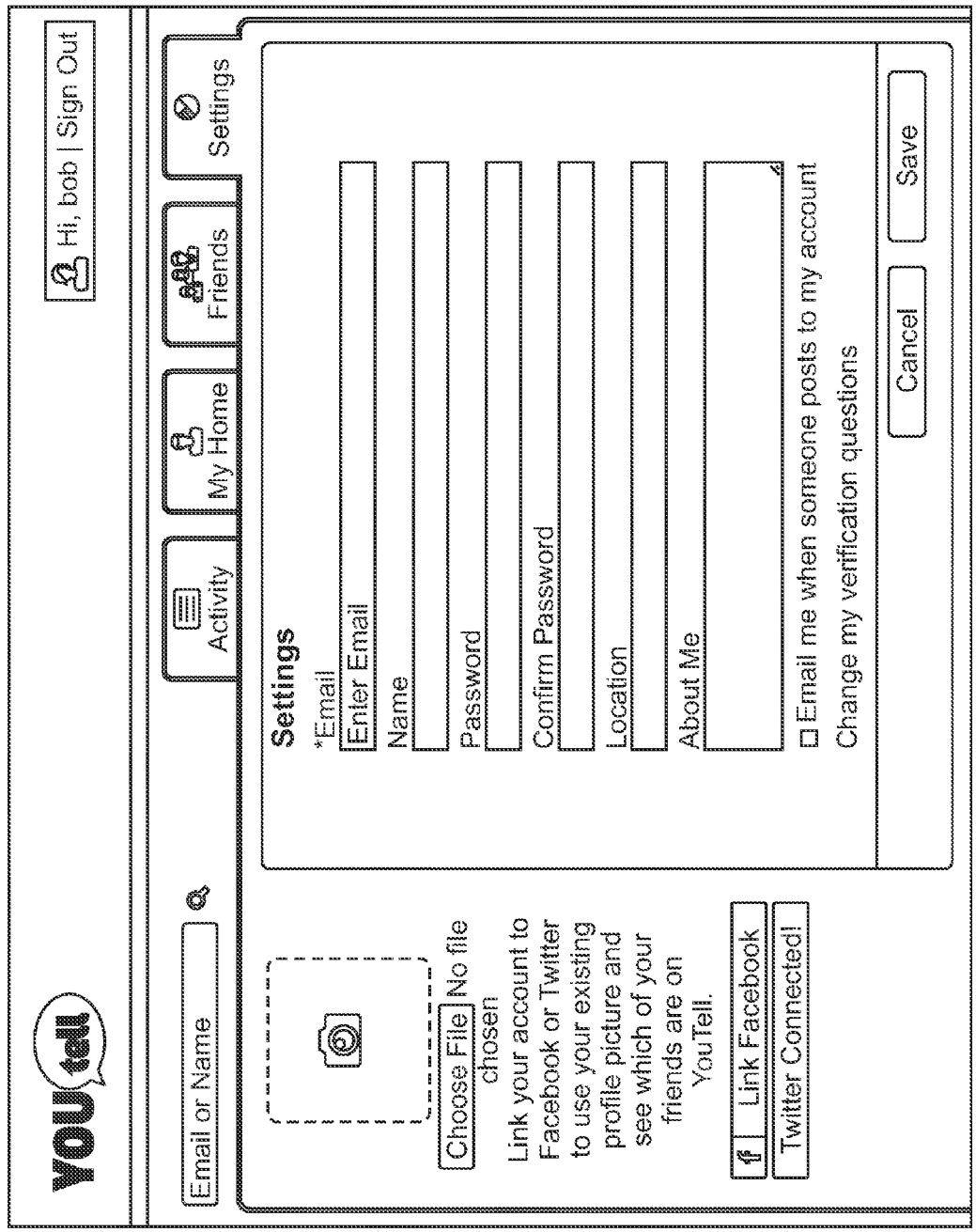

FIG. 15 illustrates a settings tab according to an embodiment. The settings tab includes options for providing user settings and information such as an image, email address, password, location, and a description about the user.

Figure 16:
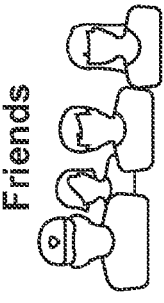

FIG. 16 illustrates a verification screen, according to an embodiment. The verification screen permits a user to provide answers and/or customized questions for different categories of persons who are associated with the user. For example, the questions may relate to friends, family, and/or co-workers. For each category, one or more questions and/or answers may be input or selected. Alternatively, the user may skip the verification options, rendering anonymous all feedback for the user.

In some embodiments, the system may be used in an enterprise environment to gauge employee satisfaction. For example, surveys might be performed according to departments such as accounting, finance, and sales. Verification questions might include: who is your boss, what project are you involved with, what does a particular person look like, what are some details of your day to day agenda, etc.

The system may be used to provide feedback with respect to restaurants, hotels, and other business services. The system may verify that you were present at the business by asking what services were provided, who were the people who assisted you, what was available on the menu, or what the interior of the business looked like (e.g., furniture, paint color, decorations, etc.). In an embodiment, before feedback can be provided, the system may request verification in terms of an image of a receipt, a transaction number, a paid amount, or other details of a transaction that occurred. Alternatively, the verification may be used to upgrade the ranking of the feedback, rather than permitting or restricting the posting of feedback.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A method performed by an automated system, the method enabling a registrant to receive comments from at least one person anonymously in a group of people known to the registrant, including the at least one person known to the registrant, the system including an internet connected server comprising a processor and the system also having a database connected to the processor, wherein the method comprises the steps of:
   (a) receiving via the internet, by the processor, a registrant's answers to multiple questions about the registrant and storing, by the processor, the registrant's answers in the database;
       (a1) receiving via the internet, by the processor, an identifier associated with the registrant from a person other than the registrant, wherein the registrant and the person are previously known to each other, and the person uses the system anonymously;
       (a2) validating, by the processor, the identifier;
   (b) after the identifier has been validated, prompting, by the processor, the person over the internet, the person being previously known to the registrant and wanting to provide an anonymous comment to the registrant, to answer questions about the registrant that have been previously answered by the registrant;
   (c) determining, by the processor, a level of closeness between the anonymous person and the registrant from a plurality of closeness levels by comparing the person's answers to the registrant's stored answers, the plurality of closeness levels being tiered by the person's knowledge of the registrant, each according to a percentage of questions answered correctly by the person, and enabling the person previously known to the registrant to communicate anonymously with the registrant depending upon the comparison of the person's answers to the registrant's stored answers;
   (d) communicating, by the processor and via the internet, comments of the person anonymously to the registrant in conjunction with the determined level of closeness;
   (e) sending to the registrant, via the internet, anonymous feedback by persons known to the registrant; and
   (f) enabling utilization of the level of closeness, by the registrant, to determine a significance of the anonymous feedback provided by persons known to the registrant.

2. The method of claim 1, further comprising a step of the registrant setting a threshold of correct answers, and the step of comparing enables the person to communicate in response to the threshold being met.

3. The method of claim 1, wherein one or more of the multiple questions about the registrant are created by and specifically tailored to the registrant.

4. The method of claim 1, further comprising the steps of:
   normalizing the person's answer to a question about the registrant; and
   confirming the normalizing of the person's answer with the person, wherein the step of normalizing is performed by the system converting the person's answer from one form to another.

5. The method of claim 4, wherein normalizing the person's answer includes determining an alternate version of the person's answer, and wherein confirming the normalizing of the person's answer with the person includes displaying the alternate version and receiving user input to accept the alternate version instead of the person's answer.

6. The method of claim 4, wherein comparing the person's answers to the registrant's stored answers includes calculating an accuracy level of each of the person's answers to the corresponding stored answer, the method further comprising determining that each of the person's answers that exceeds the accuracy level is correct.

7. The method of claim 6, wherein calculating an accuracy level of each of the person's answers to the corresponding stored answer includes the use of at least one of a spell checker, pattern matching, and a linguistic dictionary.

8. The method of claim 6, wherein calculating an accuracy level of each of the person's answers to the corresponding stored answer includes the use of each of a spell checker, pattern matching, and a linguistic dictionary.

9. The method of claim 1, further comprising the steps of:
   the system receiving a bypass code from the registrant; and
   the system presenting the person with an option to provide the bypass code to avoid having to answer questions before leaving anonymous feedback.

10. The method of claim 1, wherein the levels of closeness include a first level that is not permitted to leave feedback, and a second level that is permitted to leave feedback.

11. The method of claim 10, wherein the first level corresponds to zero percent of questions being answered correctly.

12. The method of claim 10, wherein the second level corresponds to a one-hundred percent of questions being answered correctly.

13. The method of claim 1, wherein the questions include the last name of a third party known by the registrant.

14. The method of claim 1, wherein the questions include at least one of a question about the registrant's friends, a question about the registrant's family, a question about the registrant's co-workers, and a question about the registrant's employment.

15. The method of claim 1, further comprising:
providing the anonymous person with the ability to send an anonymous request to the registrant to permit the anonymous person with the ability to provide anonymous feedback through the system despite having provided at least one incorrect answer to the questions.

16. The method of claim 15, further comprising:
sending the registrant an email detailing the anonymous person's answers to the questions.

17. The method of claim 15, further comprising:
enabling the user to determine whether the system permits provision of anonymous feedback from the anonymous person via the system despite the anonymous person's having answered at least one of the questions incorrectly.

18. The method of claim 1, wherein the registrant is a business that provides services to customers.

19. The method of claim 18, wherein the questions include at least one question related to service that was provided to the anonymous person by the business.

20. The method of claim 18, wherein the business is at least one of a restaurant and a hotel.

21. A system that enables a registrant to receive comments from at least one person anonymously in a group of people known to the registrant, including the at least one person known to the registrant, the system including an internet connected server comprising a processor and the system also having a database connected to the processor, and the system including a registration module, a rating module and a comment module connected to the server, the processor being configured to:
(a) receive via the internet a registrant's answers to multiple questions about the registrant and storing, by the processor, the registrant's answers in a database;
(a1) receive via the internet an identifier associated with the registrant from an anonymous person other than the registrant, wherein the registrant and the anonymous person are previously known to each other;
(a2) validate the identifier;
(b) after the identifier has been validated, prompt the person over the internet, the person being previously known to the registrant and wanting to provide an anonymous comment to the registrant, to answer questions about the registrant that have been previously answered by the registrant;
(c) determine a level of closeness between the anonymous person and the registrant from a plurality of closeness levels by comparing the anonymous person's answers to the registrant's stored answers, the plurality of closeness levels being tiered by the person's knowledge of the registrant, each according to a percentage of questions answered correctly by the person and enabling the anonymous person to communicate with the registrant depending upon the comparison of the anonymous person's answers to the registrant's stored answers;
(d) anonymously communicate, via the internet, a comment of the anonymous person to the registrant in conjunction with the determined level of closeness;
(e) send to the registrant, via the internet, anonymous feedback by the person known to the registrant; and
(f) enable utilization of the level of closeness, by the registrant, to determine a significance of the anonymous feedback provided by persons known to the registrant.

\* \* \* \* \*